(12) United States Patent
Montemurro et al.

(10) Patent No.: US 12,041,444 B2
(45) Date of Patent: Jul. 16, 2024

(54) AUTHENTICATION USING WIRELESS SENSING

(71) Applicant: BlackBerry Limited, Waterloo (CA)

(72) Inventors: Michael Peter Montemurro, Toronto (CA); James Randolph Winter Lepp, Ottawa (CA); Stephen McCann, Southampton (GB)

(73) Assignee: BlackBerry Limited, Waterloo (CA)

(*) Notice: Subject to any disclaimer, the term of this patent is extended or adjusted under 35 U.S.C. 154(b) by 407 days.

(21) Appl. No.: 17/446,839

(22) Filed: Sep. 3, 2021

(65) Prior Publication Data
US 2022/0078610 A1 Mar. 10, 2022

Related U.S. Application Data

(60) Provisional application No. 63/076,749, filed on Sep. 10, 2020.

(51) Int. Cl.
*H04W 12/06* (2021.01)
*H04W 4/38* (2018.01)
*H04W 4/80* (2018.01)
*H04W 12/50* (2021.01)
*H04W 12/65* (2021.01)
*H04W 12/69* (2021.01)

(52) U.S. Cl.
CPC ............ *H04W 12/06* (2013.01); *H04W 4/38* (2018.02); *H04W 12/50* (2021.01); *H04W 12/65* (2021.01); *H04W 12/69* (2021.01); *H04W 4/80* (2018.02)

(58) Field of Classification Search
CPC ..... H04W 12/06; H04W 12/08; H04W 12/02; H04W 12/12; H04W 12/084; H04W 12/47; H04W 12/0471; H04W 4/38; H04W 12/65; H04W 12/50; H04W 12/69; H04W 4/80
See application file for complete search history.

(56) References Cited

U.S. PATENT DOCUMENTS

| | | | |
|---|---|---|---|
| 9,852,600 B1 * | 12/2017 | Yoon ..................... | A63F 13/245 |
| 11,043,051 B2 * | 6/2021 | Hawkins ............. | H04W 12/069 |
| 2014/0059347 A1 * | 2/2014 | Dougherty ............ | H04W 12/06 713/168 |
| 2015/0035643 A1 * | 2/2015 | Kursun .................... | G07C 9/32 340/5.82 |
| 2015/0349810 A1 | 12/2015 | Baxley et al. | |
| 2018/0288035 A1 * | 10/2018 | Shekh-Yusef ....... | H04L 63/0823 |

(Continued)

FOREIGN PATENT DOCUMENTS

| | | | |
|---|---|---|---|
| CN | 101730105 A | * | 6/2010 |
| JP | 6689501 B2 | * | 4/2020 |

OTHER PUBLICATIONS

European Patent Office, Extended European Search Report for Appl. No. 21196115.6 dated Jan. 27, 2022 (8 pages).

(Continued)

*Primary Examiner* — Dung Hong
(74) *Attorney, Agent, or Firm* — Trop Pruner & Hu, P.C.

(57) ABSTRACT

In some examples, a system receives information based on wireless sensing performed using wireless signals of a wireless interface of a wireless node, the wireless interface of the wireless node to communicate data over a wireless connection established with another wireless device. The system performs authentication in response to the received information.

23 Claims, 4 Drawing Sheets

(56) References Cited

U.S. PATENT DOCUMENTS

| | | | |
|---|---|---|---|
| 2020/0053096 A1* | 2/2020 | Bendersky | G06F 21/32 |
| 2020/0221262 A1* | 7/2020 | Lepp | H04L 12/189 |
| 2020/0252800 A1* | 8/2020 | Grutzmacher | H04W 24/02 |
| 2021/0111990 A1* | 4/2021 | Nainar | H04L 45/28 |
| 2021/0136569 A1* | 5/2021 | Obaidi | H04W 12/37 |
| 2022/0078191 A1* | 3/2022 | Panje | H04W 12/088 |

OTHER PUBLICATIONS

National Cybersecurity Center of Excellence, Zero Trust Architecture downloaded Sep. 8, 2020 (4 pages).
Colonel Darcy Saint-Amant, Defence Information Systems Agency, Zero Trust Strategy, Nov. 13, 2019 (6 pages).
Waddell, Kaveh, Technology, All the Ways Your Wi-Fi Router Can Spy on You, Aug. 24, 2016 (8 pages).
Claudio Da Silva, IEEE 802.11-19/2103r9, Wireless LANs, 802.11 SENS SG Proposed PAR, Mar. 30, 2020 (4 pages).
Debashi Dash et al., IEEE 802.11-19/1769, CSI-based Wi-Fi Sensing: Results and Standardization Challenges, Oct. 30, 2019 (10 pages).
Dinesh Dharadia et al., IEEE 802.11-19/1987, CSI-based Context-Assisted Indoor Localization, Nov. 2019 (14 pages).
CBC Radio, Quirks & Quarks, Your Wi-Fi router could be used to watch you breathe and monitor your heatbeat, Jun. 21, 2019 (7 pages).
Alper Kerman et al., National Institute of Stndards and Technology, Implementing a Zero Trust Architecture, Mar. 2020 (20 pages).
Dean Takashi, Dell's Latitude 7400 2-in-1 laptop sensesyour presence and wakes itself, Jan. 4, 2019 (6 pages).
Canadian Patent Office, Office Action for Appl. No. 3,130,056 dated Oct. 31, 2023 (5 pages).

* cited by examiner

AUTHENTICATION USING WIRELESS SENSING

CROSS REFERENCE TO RELATED APPLICATION

This application claims the benefit under 35 U.S.C. § 119(e) of U.S. Provisional Application Ser. No. 63/076,749, filed Sep. 10, 2020, which is hereby incorporated by reference.

BACKGROUND

A user can use an electronic device to perform various tasks, including tasks at the electronic device or tasks that involve accessing a remote site (e.g., a website, an application server, a database server, a storage server, etc.). For security, the user can be authenticated before access of the electronic device is granted to the user. Examples of such authentication include an authentication based on receipt of a user credential (e.g., a user identifier and password, a certificate, a token, etc.), an authentication based on receipt of biometric information from a biometric reader (e.g., a fingerprint reader, an iris scanner, a camera, etc.), and so forth.

BRIEF DESCRIPTION OF THE DRAWINGS

Some implementations of the present disclosure are described with respect to the following figures.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

1. BACKGROUND

Zero Trust is a security term stating that no entity should be trusted. When applied to information and communications technology, this means that every connection to a specific device or network (both internal and external) should be verified (authenticated). Verification can range from an initial verification when a connection is established or verification performed on a continuous basis.

A benefit of Zero Trust is that a network that has been previously secured behind a perimeter fence (e.g., a virtual private network or VPN) can dispense with having to set up the VPN connection and authenticate directly with servers or services both on premises and in the cloud.

In addition, Zero Trust enables traditional firewalls to be moved to a specific device or network that requires security. In turn, this has the benefit of allowing various security levels to be applied to these devices or networks on a more individual basis.

The Defense Information Systems Agency (DISA) has established some Zero Trust principles, as described in "A Perspective: Zero Trust Concepts & Terminology," Nov. 13, 2019:

Never Trust, Always Verify—All users and devices are treated as untrusted. Every device, user, application workload, or data flow is authenticated and explicitly authorized to the least privilege required using dynamic security policies.

Assume Breach—Consciously operate and defend resources with the assumption that an adversary has a presence within an environment. Deny by default, heavily scrutinize requests for access, users, devices and data flows. All traffic is logged and inspected.

Verify Explicitly—All resources are consistently accessed in a secure manner using multiple attributes (dynamic and static) to derive confidence levels for contextual access to resources.

2. Issues

To perform multi-factor authentication at an end point device, security hardware may have to be added to the end point device in some examples. An end point device can include a smartphone, a desktop computer, a notebook computer, a tablet computer, a vehicle, or another electronic device. An example of a security hardware is a biometric reader that can be included in the end point device or connected over a link (wired link or wireless link) to the end point device. A biometric reader can include a fingerprint reader, an iris scanner, a camera, and so forth. Another example of a security hardware is a proximity sensor to detect a proximity of a user (or users) to an end point device.

Adding security hardware to an end point device to support multi-factor authentication can add to the overall cost of the end point device. Moreover, a biometric reader, a proximity sensor, or other security hardware may work properly only when the end point device is oriented in a certain way with respect to a user (e.g., a camera has to face a user, a biometric reader has to be oriented so that the pertinent part of the user can be captured, etc.). If the security hardware does not have the proper orientation, then the security hardware may not operate properly.

In addition, an end point device using Zero Trust security does not have a standardized interface between a security end point application and a wireless sensor, which can provide biometric information based on the end point device's environment. The standardized interface can be used for starting, stopping, and continuous monitoring of an environment of an end point device using a wireless sensor.

3. Example Implementations

3.1 Implementation 1: Zero Trust and Wireless Sensors

In accordance with some implementations of the present disclosure, instead of adding security hardware to perform authentication, such as Zero Trust authentication, multi-factor authentication or any other type of authentication, wireless sensors that are already present in an environment in which an end point device is located can be used for capturing features of a user or other object to be authenticated.

Figure 1:
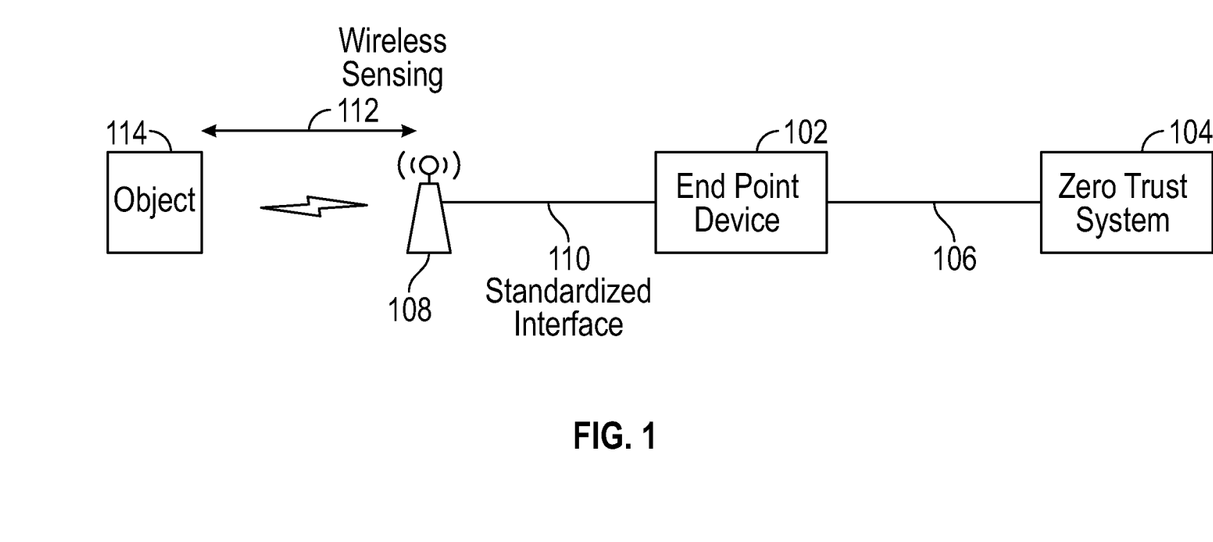
FIG. 1 is a block diagram of an example arrangement including a Zero Trust system, an end point device, a wireless node, and a target object, according to some implementations of the present disclosure.

FIG. 1 is a block diagram of an example arrangement that includes an end point device 102 connected to a Zero Trust system 104 used to perform Zero Trust authentication. Although reference is made to a Zero Trust system, it is noted that in other examples, other systems that perform authentication can be employed.

The Zero Trust system 104 can be separate from the end point device 102, but is connected to the end point device 102 over a link 106. The link 106 can be a wired link or a wireless link. For example, the Zero Trust system 104 can be part of a cloud, a server, and so forth. Alternatively, the Zero Trust system 104 can be part of the end point device 102. In such latter examples, the Zero Trust system 104 can include a program executable in the end point device 102.

The environment in which the end point device 102 is located includes a wireless node 108. For example, if the environment includes a wireless local area network (WLAN), then the wireless node 108 can include an access point (AP). An AP is a wireless access network node that allows an electronic device to establish a connection with the AP to perform communications over the WLAN.

In other examples, other types of wireless nodes can be employed, including a wireless node that is part of a cellular access network (e.g., a fifth generation or 5G cellular network, a fourth generation or 4G cellular network, etc.), a wireless node that performs communications using BLUETOOTH signals, a wireless node that performs communications using ZIGBEE signals, a wireless node that performs communications using Dedicated Short Range Communications (DSRC) signals, and so forth.

A "wireless node" can refer to any electronic device that is able to perform wireless communications. Although the wireless node 108 is shown as being outside of the end point device 102, in other examples, the wireless node 108 can be part of the end point device 102. For example, the wireless node 108 can include a WLAN controller (or another type of network interface controller) within the end point device.

The wireless node 108 (or multiple wireless nodes 108) can be used as wireless sensors to perform wireless sensing 112 of a target object 114. The target object 114 can be a user or a group of users. In other examples, the target object 114 can be a different physical object that is to be authenticated before access is granted of the end point device 102. The authentication is based on the wireless sensing 112 performed by the wireless node(s) 108.

In accordance with some implementations of the present disclosure, the wireless node 108 can provide two roles: 1) support communications between an end point device (e.g., 102) and a network, such as a WLAN or another type of network, and 2) perform wireless sensing of the target object 114 for authenticating the target object 114.

In some implementations, a standardized interface 110 is provided between the end point device 102 and the wireless node 108. For example, the standardized interface can include an application programming interface (API), which includes various routines that are invokable to perform corresponding tasks. In other examples, other types of standardized interfaces can be employed. A "standardized" interface can refer to an interface providing functionalities that entities (such as the end point device 102 and the wireless node 108) can be configured to employ for purposes of performing authentication. For example, the standardized interface 110 can be used by the end point device to initiate an authentication process. The standardized interface 110 can be used by the wireless node 108 to provide information representing wireless sensing of the target object 114 to the end point device 102.

In examples where the wireless node 108 is included inside the end point device 102, the standardized interface 110 can be between the internal wireless node 108 and another entity (e.g., a program or a hardware device) in the end point device 102.

In accordance with some implementations of the present disclosure, a wireless sensing system including the wireless node 108 (or multiple wireless nodes 108), zero or more wireless stations (STAs), sensing protocols that govern wireless transmissions and wireless receptions, and so forth, can be used to perform authentication, such as Zero Trust authentication. The wireless sensing system can leverage use of an AP, a WLAN controller, or any other type of wireless node that is already present in an environment in which the end point device 102 is located.

Information from the wireless sensing system is used to provide environmental data input to a Zero Trust system 104 through the standardized interface 110. For example, through the standardized interface 110, the wireless sensor (implemented with the wireless node 108) provides data to the end point device 102 about the local radio environment. The wireless sensor can provide an extra source of biometric information to the end point device 102. For example, the wireless node 108 (e.g., an AP that is able to perform radio communications) can act as a short range high resolution radar. The wireless sensor can act as a single source for authorization/deauthorization and other operations in the Zero Trust system 104, or can be one of multiple factors used in a security algorithm.

When a user or object is present, this can be determined by the end point device 102 and the information is fed into the Zero Trust system 104.

In some examples, the Zero Trust system 104 can build up a pattern of wireless sensor information collected using one or more wireless nodes 108. The pattern of wireless sensor information can be compared against a security threshold, which could then trigger re-authentication or can be used to determine no authentication is required (e.g., for simple IoT devices). In some examples, the pattern of wireless sensor information can be used to recognize a regular user of the end point device 102, detect that a user has moved away from the end point device 102 for greater than a specified amount of time, and so forth. In response to detecting an unauthorized user or that a user has moved away the end point device 102 for greater than a specified amount of time, the Zero Trust system 104 can take a security action, such as locking a display screen of the end point device 102, disabling network access from the end point device 102, and so forth. In other examples, the Zero Trust system 104 can determine an identity of a user by monitoring the user's gait (walking style), a typing pattern via hand motions of the user, the user's heartbeat, and/or by identifying other patterns with the wireless sensor.

In some implementations, an existing wireless system (e.g., a WLAN system, a BLUETOOTH system, etc.) associated with the end point device 102 can operate in a wireless sensing mode (through the standardized interface 110), such as when the Zero Trust system 104 requests to perform a radio environment check. For example, if the end point device 102 has not been used for some time, a key press may allow the Zero Trust system 104 to activate the WLAN radio (e.g., of the AP or a WLAN controller) as a wireless sensor for a time duration to determine the biometrics of a user. This information is then fed back into the Zero Trust system 104 to determine if the user is allowed to utilize the end point device 102.

Figure 2:
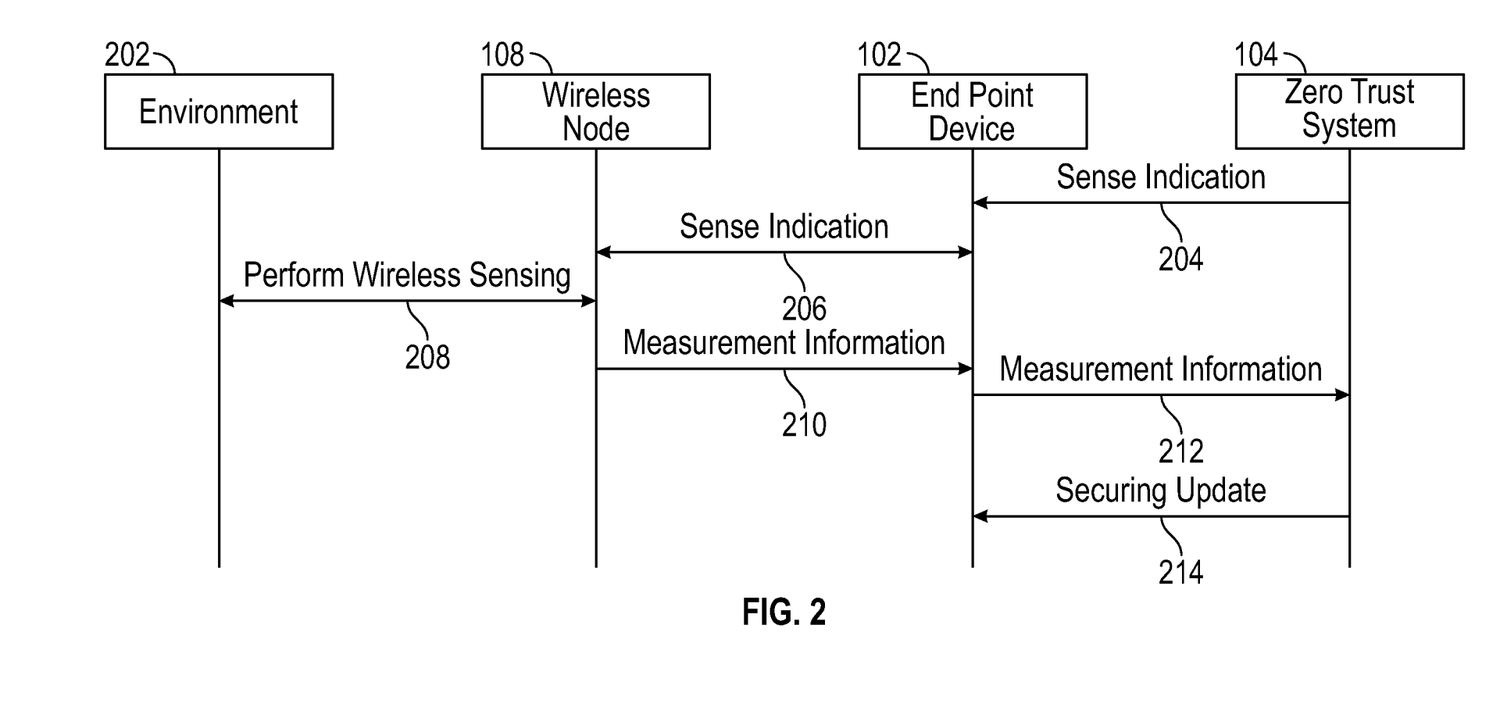
FIGS. 2 and 3 are message flow diagrams of security check processes, according to some examples.

FIG. 2 shows an example message flow for performing a security check, such as authenticating the target object 114 (e.g., a user) in an environment 202. The Zero Trust system 104 sends (at 204) a sense indication to initiate the security check. The sense indication can be in the form of a message, an information element, and so forth. The sense indication can be a request to perform a security check based on wireless sensing of an environment.

The sense indication is sent (at 204) by the Zero Trust system 104 to the end point device 102, which sends (at 206) the sense indication to the wireless node 108 through the standardized interface 110 (e.g., an API).

In some examples, the sense indication is sent on a periodic basis by the Zero Trust system 104. In other examples, the sense indication is sent by the Zero Trust system 104 in response to a different event.

In response to the sense indication, the wireless node 108 performs wireless sensing (at 208), such as by transmitting wireless signals and receiving wireless signals. For example, the transmitted wireless signals may be affected by the target object 114 in the environment 202.

The target object 114 may absorb wireless signals and/or reflect wireless signals in various directions. The wireless node 108 can collect information that is based on how wireless signals are affected (absorbed and/or reflected) by the target object 114. For example, WLAN communications use wireless signals of relatively short wavelengths (e.g., corresponding to 2.4 gigahertz (GHz) to 5 GHz). The WLAN signals can be used as radar signals, and transmitted WLAN signals can be compared to returned WLAN signals (as affected by the target object 114) to determine characteristics of a physical environment around the wireless node 108.

In some examples, WLAN sensing is being developed in a new amendment (IEEE 802.11 bf) to the IEEE (Institute of Electrical and Electronics Engineers) 802.11 standard. The IEEE 802.11 bf amendment enables stations to perform one or more of the following: inform other stations of their WLAN sensing capabilities, request and set up transmissions that allow for WLAN sensing measurements to be performed, indicate that a transmission can be used for WLAN sensing, and exchange WLAN sensing feedback and information.

The IEEE 802.11 bf amendment enables WLAN sensing measurements to be obtained using transmissions that are requested, unsolicited, or both.

According to the IEEE 802.11 bf amendment, a Medium Access Control (MAC) service interface for layers above the MAC layer can request and retrieve WLAN sensing measurements.

Measurement information acquired by the wireless node 108 based on the wireless sensing is sent (at 210) by the wireless node 108 to the end point device 102 through the standardized interface 110 (e.g., an API). The end point device 102 then sends (at 212) the measurement information to the Zero Trust system 104.

The Zero Trust system 104 creates a security update message based on the measurement information received by the Zero Trust system 104 from the end point device 102. The Zero Trust system 104 sends (at 214) the security update message to the end point device 102. The security update message can cause the end point device 102 to perform a security action, e.g., allow access of the end point device 102 by the target object 114 based on the security update message indicating that the target object 114 has been authenticated in response to the measurement information. More generally, the security update message can be in the form of security information that indicates whether or not authentication of the target object 114 was successful.

In some scenarios, the end point device 102 may be able to assess itself, by determining whether a security update is to be performed based on the measurement information.

FIG. 2 refers to an example in which a security check is initiated by the Zero Trust system 104, either periodically or in response to an event.

Figure 3:
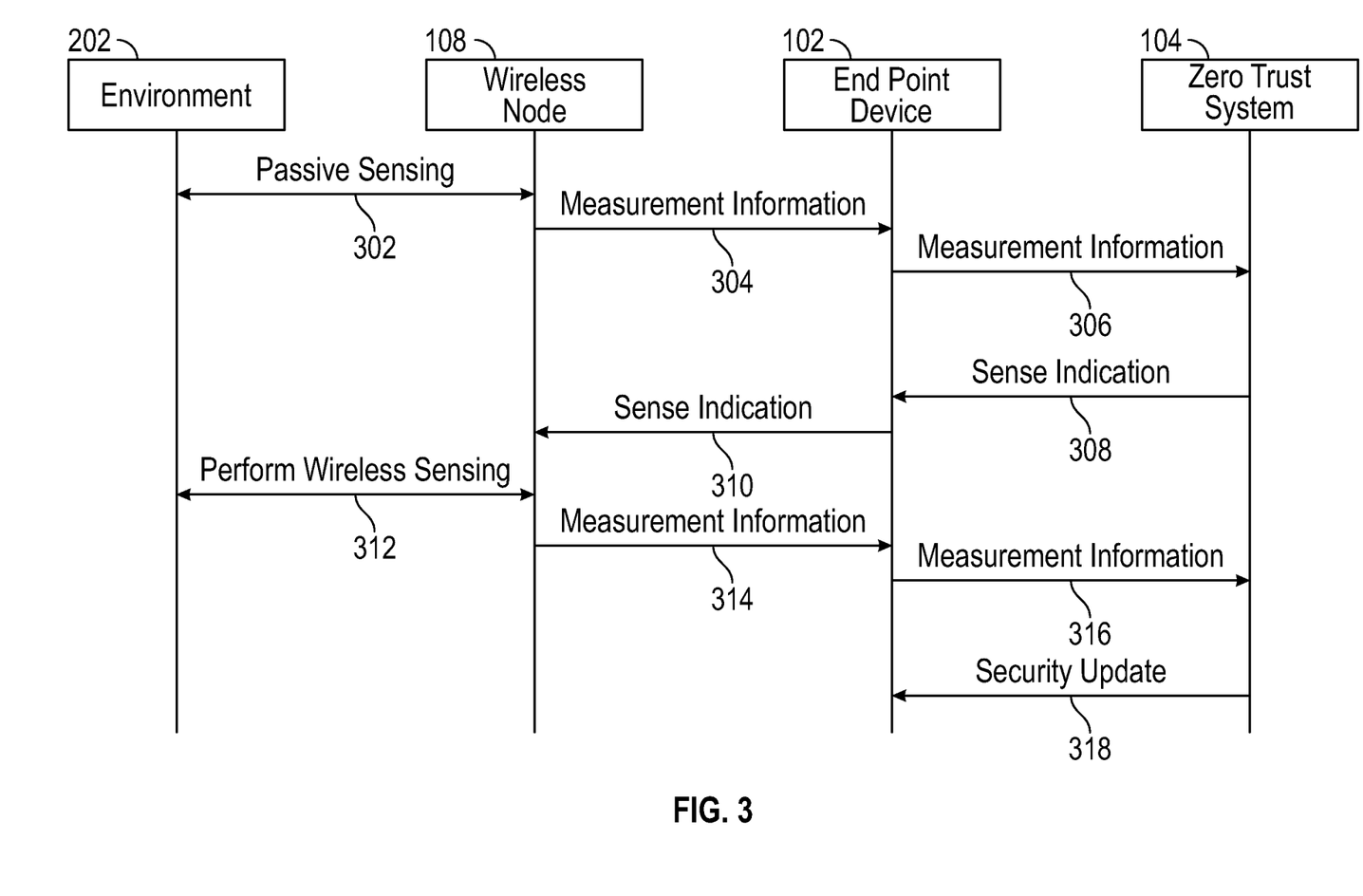

FIG. 3 shows another example in which passive sensing is used. In FIG. 3, the wireless node 108 performs passive wireless sensing (at 302) of the environment 202. For example, the wireless node 108 may be in a passive listen mode. The passive wireless sensing is performed by the wireless node 108 without being requested by the Zero Trust system 104 (or another authentication system). For example, the passive wireless sensing can be based on analyzing characteristics of wireless signals that are used as part of normal data or control communications.

Based on the passive wireless sensing, the wireless node 108 sends (at 304) measurement information to the end point device 102, through the standardized interface 110. The end point device 102 then sends (at 306) the measurement information to the Zero Trust system 104.

In response to the measurement information, the Zero Trust system 104 can initiate a re-check of the environment 202, using messaging 308, 310, 312, 314, 316, and 318, which are similar to messaging 204, 206, 208, 210, 212, and 214 of FIG. 2.

In some examples, the conditions under which an authentication or de-authentication can be performed include any or some combination of: detecting that a user has moved away from the end point device 102, detecting that the user is in an area that the user is not allowed, detecting that the user has deviated from the user's normal path or behavior, and so forth.

In some examples, a new use case and requirements for "Wi-Fi Sensing for Zero Trust" are added to the features of the IEEE 802.11 bf amendment.

The MAC/SME (station management entity) layer of the 802.11 bf amendment can be updated to provide frames and an API to allow Zero Trust applications within a WLAN device (or network to which WLAN devices are attached) to request the transmission and reception of WLAN sensing communications.

Note: the IEEE 80.11 WLAN Sensing task group project authorization request (SENS PAR) states within its scope "An interface for applications above the MAC to request and obtain WLAN sensing information." SENS PAR is discussed in IEEE P802.11 bf—"Standard for Information Technology—Telecommunications and Information Exchange Between Systems Local and Metropolitan Area Networks—Specific Requirements—Part 11: Wireless LAN Medium Access Control (MAC) and Physical Layer (PHY) Specifications Amendment: Enhancements for Wireless Local Area Network (WLAN) Sensing," previously "802.11 SENS SG Proposed PAR," IEEE 802.11-19/2103r9, dated March 2020.

If API standards are developed (e.g., open standards) for Zero Trust networks and systems, then an interface to the lower level 802.11 MAC layer may be developed in 802.11.

It may also be possible for WLAN sensing devices to store (cache) previous sensing measurements and for this information to also be accessible to Zero Trust applications.

Two modes of operation may be provided: a continuous mode, and a scheduled or on-demand mode. In the continuous mode, an end point device is continually monitored for Zero Trust security (e.g., the end point device is being used in public) and so sensing continuously operates.

In the scheduled or on-demand mode, sensing is scheduled to operate for a short period on a scheduled basis to re-check the Zero Trust status. Alternatively, the Zero Trust system may explicitly send a command to the end point device to perform sensing.

3.2 Implementation 2: Other SENS Vertical Applications

There are other use cases for WLAN sensing information.

For example, in an emergency use case, the wireless sensing system can be used to determine whether there is an environmental emergency in a space. The output of the wireless sensing system can be fed into a crisis communications system, which can send a notification of the emergency. This can lead to mass notifications and situational awareness.

As another example, in a human health use case: the wireless sensing system can be used to detect health issues with a user, such as the regular user of an end point device. Deviations from historical movement patterns of a user may be indicative of a health issue, such as a concussion, a muscle injury, a bone injury, a stroke, a change in heart function, and so forth.

The wireless sensing system can monitor for a change in a user's movement pattern, and can inform the user to seek assessment from a medical professional. In a further aspect, the Zero Trust system continues to operate despite the change in the user's behavior. The authentication performed by the Zero Trust system can have multiple factors. One way to have more than one factor is that the single WLAN-based sensing system measures more than one biometric feature.

3.3 Implementation 3: Other WLAN Information

In addition to WLAN sensing information (e.g., according to IEEE 802.11 bf), other information from WLAN systems may also contribute to a Zero Trust solution. Examples of such other information include antenna and power characteristics (a range of power of signals from the antenna, a range of frequencies of the antenna, etc.), which can provide a fingerprint of very precise manufacturing differences between individual devices. Authentication of the target object 114 (e.g., a user, an electronic device, etc.) can be based on a comparison of the foregoing information to characteristic information previously stored for the target object 114, such that a deviation of the foregoing information from the characteristic information is indicative that the target object 114 should not be authenticated (in other words, the current fingerprint based on the antenna or power characteristics does not match an expected fingerprint). In further examples, the other information can include a history of Service Set Identifier (SSID) and MAC address use and how often they change (this is another example of a fingerprint). The historical information including SSID and MAC address use (and their frequency of change) can be compared to a current SSID and MAC address use, and a deviation may indicate that the target object 114 should not be authenticated. In additional examples, the other information can include how many users use a same end point device. Historical information can be stored regarding a quantity of users that have previously used the end point device, and a current quantity of users using the end point device can be compared to the historical quantity of users-a deviation in the quantities can indicate that the target object 114 should not be authenticated.

The foregoing additional information can be used as factors in a multi-factor authentication system at a server. These can also be used as factors in an end point detection and response (EDR) system embedded within end point devices.

4. Example Systems

Figure 4:
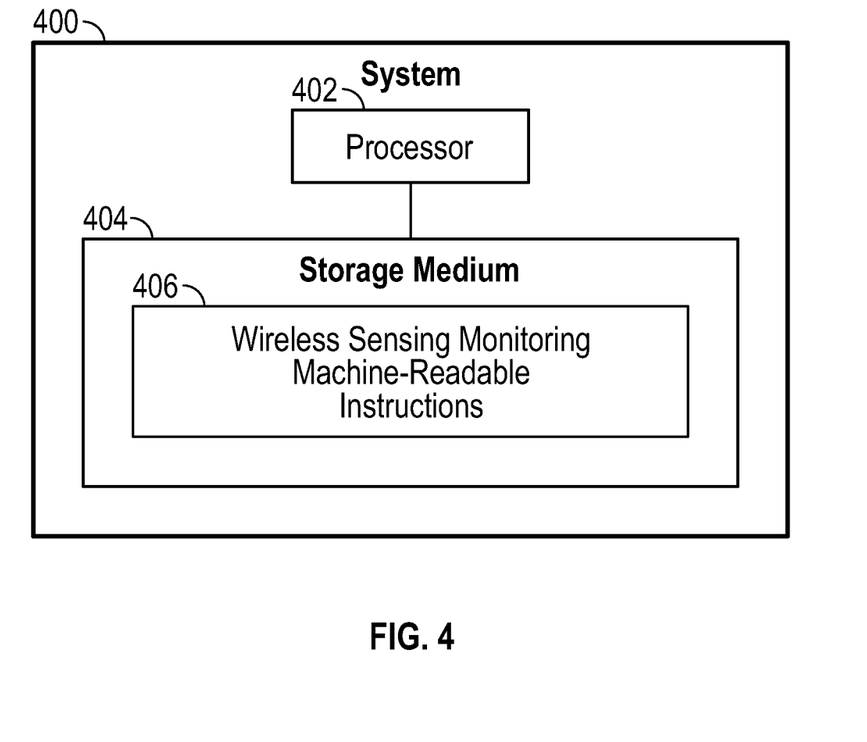
FIG. 4 is a block diagram of a system according to some examples.

FIG. 4 is a block diagram of a system 400, which can be the Zero Trust system 104 (FIG. 1), the end point device 102, or a combination of the Zero Trust system 104 and the end point device 102.

The system 400 includes one or more hardware processors 402. A hardware processor can include a microprocessor, a core of a multi-core microprocessor, a microcontroller, a programmable integrated circuit, a programmable gate array, or another hardware processing circuit.

The system 400 further includes a non-transitory machine-readable or computer-readable storage medium 404 storing wireless sensing monitoring machine-readable instructions 406 executable on the one or more hardware processors 402 to perform various tasks. For example, the wireless sensing monitoring machine-readable instructions 406 are executable to receive information based on wireless sensing performed using wireless signals of a wireless interface of a wireless node (e.g., 108 in FIG. 1). The wireless interface (e.g., a radio interface, such as a WLAN radio interface, a cellular radio interface, a BLUETOOTH interface, etc.) of the wireless node communicates data over a wireless connection established with another wireless device.

The wireless sensing monitoring machine-readable instructions 406 are executable to perform authentication in response to the received information.

For example, the information includes biometric information of a user, and the authentication relates to the user based on the biometric information.

In further examples, the wireless sensing monitoring machine-readable instructions 406 are executable to store a pattern of wireless sensing information, and initiate a process to perform the authentication based on the pattern of wireless sensing information. For example, the pattern of wireless sensing information is based on a motion of a user. As another example, the pattern of wireless sensing information is based on a biometric feature (e.g., face, eyes, and/or other physical features) of a user.

Several benefits of some example implementations are set forth below. The example implementations may remove the need for a user to manually enter their credentials for electronic device use, such as when the user has been separated from the electronic device for a short time. Correspondingly, the electronic device may be able to power down when a user is not detected.

The example implementations may improve the strength of security when an electronic device is moving between different network types (e.g., wired to wireless, a cellular network to a WLAN). Additional security checks can be made when a user is entering a banking or payment application on a device.

The proposed system can be used to enable basic presence detection without additional hardware and physical design complexity to add such hardware sensors to the front of a device. The system can also be used to add more complex presence detection such as identifying a user without expensive high definition camera and other hardware. The system also enables more flexibility in the product design because the WLAN or other wireless sensing antennas can be inside the device and work regardless of device orientation, while presence sensors and cameras have to be mounted on the front of a product and pointed at the user at a specific angle.

A storage medium (e.g., 404 in FIG. 4) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory or other type of non-volatile memory device; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method of a system comprising a hardware processor, comprising:
   receiving information based on wireless sensing of an object performed using wireless signals of a wireless interface of a wireless node, the wireless interface of the wireless node to communicate data of an end point device over a wireless connection established with another wireless device; and
   performing authentication in response to the received information, wherein the information is based on a communication over a standardized interface between the wireless node and the end point device.

2. The method of claim 1, wherein the wireless sensing comprises one or more of:
   wireless local area network (WLAN) sensing using WLAN signals,
   wireless sensing using BLUETOOTH signals,
   wireless sensing using ZIGBEE signals,
   wireless sensing using Dedicated Short Range Communications (DSRC) signals, and
   wireless sensing using cellular signals.

3. The method of claim 1, wherein the wireless node provides a plurality of roles, the plurality of roles comprising:
   supporting communications between the end point device over the wireless connection with the another wireless device, and
   performing the wireless sensing of the object for the authentication.

4. The method of claim 1, wherein the system is part of the end point device or is separate from the end point device.

5. The method of claim 1, wherein the standardized interface comprises an application programming interface (API).

6. The method of claim 1, further comprising:
   sending, by the system, a request to perform a security check based on wireless sensing of an environment,
   wherein the receiving and the performing of the authentication is in response to the request.

7. The method of claim 1, wherein the information is received based on a passive sense mode of the wireless node.

8. The method of claim 1, wherein the information comprises biometric information of a user, and the authentication relates to the user based on the biometric information.

9. The method of claim 1, further comprising:
   storing a pattern of wireless sensing information; and
   initiating a process to perform the authentication based on the pattern of wireless sensing information.

10. The method of claim 9, wherein the pattern of wireless sensing information is based on a motion of a user.

11. The method of claim 9, wherein the pattern of wireless sensing information is based on a biometric feature of a user.

12. The method of claim 1, further comprising:
    determining, by the system based on the received information, presence of an emergency in an environment; and
    in response to determining the presence of the emergency, sending, by the system, a notification of the emergency.

13. The method of claim 1, further comprising:
    determining, by the system based on the received information, a health status of a user.

14. The method of claim 1, further comprising:
    receiving, by the system, further information regarding antenna or power characteristics based on the wireless signals of the wireless interface of the wireless node,
    wherein the authentication is further based on the further information.

15. The method of claim 1, further comprising:
    determining, based on the wireless signals of the wireless interface of the wireless node, a fingerprint of the wireless node,
    wherein the authentication is further based on the fingerprint.

16. The method of claim 1, further comprising:
    determining, based on the wireless signals of the wireless interface of the wireless node, a quantity of users,
    wherein the authentication is further based on the determined quantity of users.

17. The method of claim 1, wherein the authentication comprises Zero Trust authentication.

18. A system comprising:
    a processor; and
    a non-transitory storage medium storing instructions executable on the processor to:
        receive information based on wireless sensing of an object performed using wireless signals of a wireless interface of a wireless node, the wireless interface of the wireless node to communicate data of an end point device over a wireless connection established with another wireless device; and perform authentication in response to the received information, wherein the wireless node provides a plurality of roles, the plurality of roles comprising:
supporting communications between the end point device over the wireless connection with the another wireless device, and
performing the wireless sensing of the object for the authentication.

19. The system of claim 18, wherein the information comprises biometric information of a user, and the authentication relates to the user based on the biometric information.

20. The system of claim 18, wherein the instructions are executable on the processor to further:
store a pattern of wireless sensing information; and
initiate a process to perform the authentication based on the pattern of wireless sensing information.

21. The system of claim 20, wherein the pattern of wireless sensing information is based on a motion of a user.

22. The system of claim 18, wherein the wireless interface of the wireless node is to communicate data over the wireless connection established over a wireless local area network (WLAN) with the another wireless device, and the wireless sensing comprises WLAN wireless sensing using WLAN signals as radar signals.

23. A non-transitory storage medium storing instructions that upon execution cause a system to:
receive information based on wireless sensing of a target object performed using wireless signals of a wireless interface of a wireless node, the wireless interface of the wireless node to communicate of an end point device data over a wireless network established with another wireless device; and
perform authentication of the target object in response to the received information, wherein the information is based on a communication over a standardized interface between the wireless node and the end point device.

* * * * *